(12) United States Patent
Rehr et al.

(10) Patent No.: US 11,299,028 B2
(45) Date of Patent: Apr. 12, 2022

(54) DRIVE DEVICE FOR A MOTOR VEHICLE, CORRESPONDING MOTOR VEHICLE, AND METHOD FOR OPERATING A DRIVE DEVICE

(71) Applicant: AUDI AG, Ingolstadt (DE)

(72) Inventors: Alfred Rehr, Hepberg (DE); Thierry Caramigeas, Walldorf (DE)

(73) Assignee: AUDI AG, Ingolstadt (DE)

( * ) Notice: Subject to any disclaimer, the term of this patent is extended or adjusted under 35 U.S.C. 154(b) by 397 days.

(21) Appl. No.: 16/346,914

(22) PCT Filed: Oct. 30, 2017

(86) PCT No.: PCT/EP2017/077716
§ 371 (c)(1),
(2) Date: May 2, 2019

(87) PCT Pub. No.: WO2018/086923
PCT Pub. Date: May 17, 2018

(65) Prior Publication Data
US 2019/0255934 A1 Aug. 22, 2019

(30) Foreign Application Priority Data
Nov. 8, 2016 (DE) .................. 10 2016 221 880.8

(51) Int. Cl.
*B60K 6/40* (2007.10)
*B60K 1/02* (2006.01)
(Continued)

(52) U.S. Cl.
CPC .............. *B60K 6/40* (2013.01); *B60K 1/02* (2013.01); *B60K 6/36* (2013.01); *B60K 6/387* (2013.01);
(Continued)

(58) Field of Classification Search
CPC .......... B60K 6/40; B60K 6/387; B60K 17/34; B60K 6/36; B60K 6/52; B60K 6/48;
(Continued)

(56) References Cited

U.S. PATENT DOCUMENTS 8,251,849 B2 * 8/2012 Holmes ................. B60K 6/365
475/5
9,050,903 B2 * 6/2015 Wozniak ................ B60L 15/20
(Continued)

FOREIGN PATENT DOCUMENTS

CN 102069729 A 5/2011
CN 104602941 A 5/2015
(Continued)

OTHER PUBLICATIONS

International Preliminary Report on Patentability (Chapter 1) dated May 14, 2019 of corresponding International application No. PCT/EP2017/077716; 10 pages.
(Continued)

*Primary Examiner* — Jacob B Meyer
(74) *Attorney, Agent, or Firm* — Maier & Maier, PLLC

(57) ABSTRACT

A drive device for a motor vehicle, having a first drive unit, a second drive unit, and a first output shaft which can be coupled or is coupled to a first wheel drive shaft of the motor vehicle, and/or a second output shaft which can be coupled or is coupled to a second wheel drive shaft of the motor vehicle, wherein the first drive unit and the second drive unit can be coupled jointly to the first output shaft and/or the second output shaft. It is provided here that the second drive unit can be coupled via a separating clutch to the first drive unit, a transmission output shaft of a transmission which is coupled to the first drive unit.

16 Claims, 3 Drawing Sheets

(51) Int. Cl.
  *B60K 17/02* (2006.01)
  *B60W 10/08* (2006.01)
  *B60K 6/387* (2007.10)
  *B60W 10/119* (2012.01)
  *B60K 17/34* (2006.01)
  *B60W 20/40* (2016.01)
  *B60K 6/36* (2007.10)
  *B60K 6/52* (2007.10)
  *B60W 10/02* (2006.01)
  *B60K 6/48* (2007.10)
  *B60K 17/346* (2006.01)
  *F16H 48/36* (2012.01)

(52) U.S. Cl.
  CPC .......... *B60K 6/48* (2013.01); *B60K 6/52* (2013.01); *B60K 17/02* (2013.01); *B60K 17/34* (2013.01); *B60K 17/346* (2013.01); *B60W 10/02* (2013.01); *B60W 10/08* (2013.01); *B60W 10/119* (2013.01); *B60W 20/40* (2013.01); *B60K 2006/4808* (2013.01); *B60K 2006/4833* (2013.01); *B60W 2510/081* (2013.01); *B60W 2710/021* (2013.01); *F16H 2048/364* (2013.01); *Y02T 10/62* (2013.01)

(58) Field of Classification Search
  CPC ........ B60K 17/346; B60K 1/02; B60K 17/02; B60K 2006/4808; B60K 2006/4833; B60W 10/119; B60W 20/40; B60W 10/02; B60W 10/08; B60W 2510/081; B60W 2710/021; Y02T 10/62; F16H 2048/364
  See application file for complete search history.

(56) References Cited

U.S. PATENT DOCUMENTS

| | | | | |
|---|---|---|---|---|
| 9,059,602 B2* | 6/2015 | Tsuchiya | .................... | H02J 7/16 |
| 9,061,685 B2* | 6/2015 | Kobayashi | ........... | B60W 10/119 |
| 9,139,088 B2* | 9/2015 | Okubo | .................... | B60K 6/445 |
| 9,168,825 B2* | 10/2015 | Ortmann | ................ | B60K 6/547 |
| 9,193,263 B2* | 11/2015 | Ekonen | .................. | B60K 17/35 |
| 9,243,673 B2* | 1/2016 | Kodama | .............. | B60K 17/344 |
| 9,333,966 B2* | 5/2016 | Matsudaira | ........... | B60W 20/00 |
| 9,764,739 B2* | 9/2017 | Deutsch | .............. | F16H 57/0412 |
| 9,809,207 B2* | 11/2017 | Frijas | ..................... | B60T 8/175 |
| 9,821,778 B2* | 11/2017 | Frijas | ..................... | B60T 7/122 |
| 9,893,657 B2* | 2/2018 | Luedtke | ................... | H02P 6/14 |
| 9,902,393 B2* | 2/2018 | Endo | .................. | B60W 50/082 |
| 10,035,502 B2* | 7/2018 | Hokoi | .................... | B60K 6/445 |
| 10,272,776 B2* | 4/2019 | Suzuki | ................... | B60K 17/34 |
| 10,391,852 B2* | 8/2019 | Jorgensson | ............. | B60K 6/40 |
| 10,604,138 B2* | 3/2020 | Foster | ................... | B60K 17/02 |
| 10,906,528 B2* | 2/2021 | Abe | ..................... | B60K 6/442 |
| 2003/0085062 A1* | 5/2003 | Bowen | ..................... | B60K 6/48 |
| | | | | 180/65.1 |
| 2011/0115318 A1* | 5/2011 | Hashimoto | ............. | B60L 50/15 |
| | | | | 310/78 |
| 2014/0135168 A1* | 5/2014 | Yokoo | ................... | B60K 23/08 |
| | | | | 477/8 |
| 2019/0255934 A1* | 8/2019 | Rehr | ........................ | B60K 1/02 |
| 2020/0114751 A1* | 4/2020 | Hofer | .................... | B60K 6/387 |
| 2020/0132168 A1* | 4/2020 | Roske | ..................... | F16H 3/006 |

FOREIGN PATENT DOCUMENTS

| | | |
|---|---|---|
| DE | 199 54 544 A1 | 8/2001 |
| DE | 10 2005 022 210 A1 | 11/2006 |
| DE | 60 2004 012 517 T2 | 4/2009 |
| DE | 10 2009 002 805 A1 | 11/2010 |
| DE | 10 2010 060 340 A1 | 5/2012 |
| DE | 10 2015 205 102 A1 | 12/2015 |
| DE | 10 2014 009 866 A1 | 1/2016 |
| WO | 2009/021574 A1 | 2/2009 |
| WO | 2014/033137 A1 | 3/2014 |
| WO | 2015185313 A1 | 12/2015 |
| WO | 2016/162609 A1 | 10/2016 |

OTHER PUBLICATIONS

German Office Action dated Oct. 23, 2019, in connection with corresponding DE Application No. 10 2016 221 880.8 (11 pgs., including machine-generated English translation).

Examination Report dated Sep. 1, 2017 of corresponding German application No. 10 2016 221 880.8; 14 pages.

International Search Report and Written Opinion of the International Searching Authority dated Jan. 26, 2018 in corresponding International application No. PCT/EP2017/077716; 32 pages.

Chinese Office Action dated Aug. 23, 2021, in connection with corresponding CN Application No. 201780068775.4 (15 pp., including machine-generated English translation).

\* cited by examiner

DRIVE DEVICE FOR A MOTOR VEHICLE, CORRESPONDING MOTOR VEHICLE, AND METHOD FOR OPERATING A DRIVE DEVICE

FIELD

The disclosure relates to a drive device for a motor vehicle, having a first drive unit, a second drive unit, and a first output shaft, which is or may be coupled to a first wheel drive shaft of the motor vehicle, and/or a second output shaft, which is or may be coupled to a second wheel drive shaft of the motor vehicle, wherein the first drive unit and the second drive unit may be coupled jointly to the first output shaft and/or the second output shaft. Furthermore, the invention relates to a motor vehicle and a method for operating such a drive system.

BACKGROUND

The drive device is used to drive the motor vehicle, i.e., providing a torque directed towards driving the motor vehicle. The drive device is equipped with the first drive unit and the second drive unit. The two drive units, i.e., the first drive unit and the second drive unit, may basically be identical or of different types. In the latter case, the drive device is, e.g., a hybrid drive device. It may be provided that the first drive unit is designed as an internal combustion engine and the second drive unit as an electric machine.

The drive device has exactly one or more output shafts, i.e., the first output shaft and/or the second output shaft. Each of the two output shafts is or may be coupled to one of the wheel axles of the motor vehicle, in the latter case preferably rigidly and/or permanently. The wheel axles, i.e., the first and the second wheel drive shaft and the second wheel drive shaft may be associated with different wheel axles of the vehicle or the same wheel axle of the motor vehicle. At least one wheel of the motor vehicle or of the respective wheel axle may be driven by means of the drive unit via each of the wheel axles. For example, the respective wheel is rigidly and/or permanently coupled to the corresponding wheel axle.

The motor vehicle may have only the first wheel drive shaft, or at least a first wheel drive shaft, or only the second wheel drive shaft, or at least a second wheel drive shaft. Thus, only one wheel axle of the motor vehicle may be driven. Accordingly, only the first output shaft or the second output shaft is present. Alternatively, however, the first wheel drive shaft and the second wheel drive shaft, or at least a first wheel drive shaft and at least a second wheel drive shaft may be present, such that several wheel axles of the motor vehicle are drivable. Accordingly, both the first output shaft and the second output shaft are present. If, in the context of this specification, an embodiment is described, in which both wheel axles or both output shafts are present, then the explanations always apply to an alternative embodiment, according to which only the first wheel drive shaft or the second wheel drive shaft, and correspondingly only the first output shaft or the second output shaft is present.

Obviously, it may also be provided that several wheels of the motor vehicle, in particular several wheels of the same wheel axle, may be driven via at least one of the wheel axles or both wheel axles. In the latter case, e.g., the first wheel drive shaft is or may be coupled to the first output shaft, as may additionally a further first wheel drive shaft. Preferably, in this case, the first wheel drive shaft and the further wheel drive shaft are coupled to the first output shaft via a differential gear. The first wheel drive shaft and the further first wheel drive shaft are associated with, e.g., the same wheel axle of the motor vehicle, i.e., coupled to different wheels of this wheel axle. This also applies to the second output shaft and the second wheel drive shaft. Here too, a further wheel drive shaft may be provided.

If the drive device is not yet mounted in the motor vehicle, i.e., is separate therefrom, it should preferably be possible to couple both wheel axles to their respective wheel axles. After mounting the drive device in the motor vehicle, the output shafts are preferably coupled to their respective wheel axles. If one device may be coupled to another, it means that the operative connection between them is only temporary, in particular either optionally established or is interrupted. If, on the other hand, the device is coupled to the other [device], then preferably a permanent and/or rigid coupling is meant.

SUMMARY

The object of the invention is to propose a drive device for a motor vehicle having advantages over the known drive unit, in particular by enabling energy-saving driving of the motor vehicle via numerous operating states, in particular by realizing single-axis operation and/or multi-axis operation.

The second drive unit may be coupled via a separating clutch to the first drive unit, a transmission output shaft of a transmission, which is coupled to the first drive unit, a transmission shaft, which is or may be coupled to the second output shaft, and which is or may be coupled to the first drive unit, a differential gear output shaft of a differential gear mechanism, which, on the input side, is or may be coupled to the first drive unit, or an intermediate shaft, which is or may be coupled to the first output shaft, and which may be coupled to the transmission shaft by means of a clutch.

In the context of the drive unit described here, the first drive unit and the second drive unit may be coupled jointly to the first output shaft and/or the second output shaft, i.e., the first output shaft, the second output shaft, or both This means that in at least one operating mode of the drive device, both drive units are coupled jointly to the first output shaft, the second output shaft, or both. Furthermore, it may be provided that the first drive unit separately from the second drive unit is or may be coupled to the first output shaft. In this case, the first drive unit may be coupled accordingly to the first output shaft, while the second drive unit is decoupled from the first output shaft.

The first drive unit and/or the transmission output shaft of the transmission preferably is or may be coupled to the transmission shaft. In the former case, a permanent operative compound is provided, whereas in the latter case, the operative connection is interruptible. For example, a first clutch is present between the first drive unit or the transmission output shaft, on the one hand, and the transmission shaft, on the other, such that in a first shift position of the first clutch, the operative connection between the first drive unit and the first output shaft is interrupted, and in a second shift position, the operative connection is established at least partially, but preferably rigidly.

The transmission shaft, in turn, preferably is or may be coupled to the second output shaft. In the first situation, the transmission shaft is permanently and operatively connected to the second output shaft. However, in the latter situation, it can be decoupled from the second output shaft via a second clutch between the transmission shaft, on the one hand, and the second output shaft, on the other. Accordingly, the operative connection between the transmission shaft and the second output shaft may can be interrupted in a first switching position of the second clutch, and established in a second switching position, again at least partially, preferably rigidly.

The transmission shaft is in the form of an articulated shaft, e.g., a cardan shaft. Thus, the first wheel drive shaft, which cannot or is not coupled to the first drive unit via the transmission shaft, but rather by bypassing it, is preferably associated with a first wheel axle of the motor vehicle, and the second output shaft with a second wheel axle, which differs from the first wheel axle. For example, the first wheel axle is in the form of a front axle of the motor vehicle, and the second wheel axle is in the form of a rear axle of the motor vehicle, or vice versa.

The second drive unit is connected via the separating clutch to the first drive unit, the transmission output shaft, the transmission shaft, the differential gear output shaft or the intermediate shaft. This means that in a first shift position of the separating clutch, the operative connection between the second drive unit and the other device is interrupted and, in a second switching position, at least partially, but preferably rigidly established. By means of the separating clutch, the second drive unit may be completely decoupled from the corresponding device.

The separating clutch is, e.g., a non-positive clutch or preferably a positive clutch. The friction clutch is designed, in particular, as a multi-plate clutch, whereas the form-fitting clutch may be a claw clutch, sleeve clutch, or the like. In any case, however, the separating clutch enables the second drive unit to be completely decoupled from the first output shaft and/or the second output shaft, i.e., by completely decoupling it from the respective device to which it may be coupled via the separating clutch. Device therefore refers to the first drive unit, the transmission output shaft, the transmission shaft, the differential gear output shaft, or the intermediate shaft.

Transmission preferably refers to a gear-change transmission, whereby a gear selected from several gears may be set according to a certain ratio. The speed-change gear is preferably provided between the first drive unit, on the one hand, and the first output shaft and/or the second drive unit and/or the transmission shaft and/or the differential gear output shaft, on the other. Moreover, a starting clutch may be present between the first drive unit and the transmission. Obviously, the starting clutch may also be integrated in the transmission.

The differential gear is preferably present as a center differential gear. A differential input shaft of the differential gear may preferably be coupled to the first drive unit, e.g., via the transmission or gear-change transmission. A first differential output shaft of the differential gear is or may be coupled to the first output shaft, as is a second differential output shaft to the second output shaft. The above differential output shaft may now be either the first differential output shaft or the second differential output shaft, preferably corresponding to the first differential output shaft.

In known drive devices, it is provided, for example, that the first drive unit may be coupled to the second drive unit via the above-mentioned starting clutch and thereby to one of the wheel axles or to several or all of the wheel axles. It may be provided that the gear change transmission is provided in the operative connection between the second drive unit and at least one wheel drive shaft, whereby the gear selected from several travel gears may be set. Thus, the second drive unit is always coupled to the output shaft, while the first drive unit can be selectively engaged via the starting clutch.

However, this also entails that the second drive unit is always entrained, even when it is not needed to provide the drive torque for the motor vehicle. Accordingly, it is especially required to design the second drive unit, such that it is adapted for all rotational speeds achievable via the first drive unit, which may give rise to a relatively large embodiment of the second drive unit. For this reason, it is now provided that the second drive unit be decoupled by means of the separating clutch from further elements of the drive device.

In other words, the second drive unit is or will be coupled to one of the output shafts only when one or both of the output shafts are driven by the second drive unit. In single-axis operation, for example, only one of the output shafts is driven by the second drive unit. However, multi-axle operation of the drive unit may also be done, in which a drive torque is provided on both output shafts, preferably by means of the first drive unit, as well as the second drive unit. In the latter case, both the first drive unit and the second drive unit are preferably coupled to both the first output shaft and the second output shaft.

Accordingly, it may be provided, for example, that the second drive unit is designed only for a certain rotational speed and/or travel speed range of the motor vehicle, which applies in the context of multiple operation. For example, it is possible to design the second drive unit for a lower maximum rotational speed than the second drive unit, such that the second drive unit may be designed to be substantially smaller than in the known embodiments. When determining the maximum speed, the transmission or gear-change transmission must be accounted for, if present between the first and the second drive units.

The second drive unit is preferably positioned coaxially with the transmission output shaft and/or the transmission shaft. However, a position adjacent to the gear output shaft and/or the transmission shaft, in particular parallel to the axis of the gear output shaft and/or the transmission shaft, may also be provided.

A further embodiment of the invention provides that the first drive unit may be coupled via a first clutch to the transmission, which is coupled to the second output shaft, or coupled via a second clutch to the second output shaft. Such an embodiment was already mentioned above. With the aid of the two clutches, i.e., the first clutch and the second clutch, the transmission shaft may be completely decoupled from both the first drive unit and the second output shaft.

Accordingly, it may be provided to shut down the transmission shaft, if and/or when the second output shaft is not to be driven by the first drive unit. Thus, the drive power otherwise required to maintain the rotary motion of the transmission shaft may be saved, which would otherwise have to be provided by the first drive unit and/or via the second drive shaft. Such an embodiment already allows for certain energy savings, in that the second drive shaft may be coupled from the first drive unit, as may be the transmission shaft.

In the context of a further embodiment of the invention, it is provided that the second drive unit may be coupled via the separating clutch to an input side of the first clutch on the side of the first drive unit. Thus, the input side of the first clutch is remote from the transmission shaft and can either be decoupled therefrom or coupled thereto. The input side of the first clutch is coupled or at least may be coupled to the first drive unit and/or the transmission output shaft. The separating clutch is now present between the second drive unit and the input side of the first clutch, such that the second drive unit can be connected directly to the input side of the first clutch by means of the separating clutch.

A further preferred embodiment of the invention provides that the differential gear output shaft of the differential gear is coupled to the first output shaft, in particular via a further differential gear. The differential gear output shaft corresponds to the first differential gear output shaft output already mentioned above, which is coupled to the first output shaft, preferably permanently. The operative connection between the differential gear output shaft and the first output shaft may be present via the further differential gear, which is designed, e.g., as an axle differential gear.

A further embodiment of the invention may provide that a further differential gear output shaft of the differential gear is or may be coupled to the transmission shaft. The further differential gear output shaft thus corresponds to the second differential gear output shaft mentioned above, via which the active connection to the second output shaft may be established. Hence, the further differential gear output shaft is or may be coupled to the transmission shaft. In the former case, the further differential gear output shaft is rigidly and/or permanently coupled to the transmission shaft, while in the latter, e.g., the first clutch is present between the other differential gear output shaft and the transmission shaft.

Finally, a preferred embodiment of the invention may provide that the first drive unit and/or the transmission output shaft of the transmission is/are coupled to the transmission shaft, and that the first output shaft may be coupled to the transmission shaft via the first clutch, as may the second drive unit via the separating clutch and the first clutch. Here, the first drive unit and/or the transmission output shaft is rigidly and/or permanently connected to the transmission shaft. Moreover, it should be possible to couple the first output shaft to the transmission shaft via the first clutch.

The second drive unit may now be coupled to the transmission shaft via the separating clutch and the first clutch. Thus, if the second drive unit is connected to the transmission shaft or operatively connected thereto, this operative connection exists via the separating clutch and the first clutch, i.e., exclusively. The second drive unit is therefore connected operatively to the transmission shaft only when both the separating clutch and the first clutch are closed, at least partially or completely.

The invention further relates to a motor vehicle with a drive device, in particular a drive device according to one or more of the preceding claims, wherein the drive device has a first drive unit, a second drive unit, as well as a first output shaft coupled to a first wheel drive shaft of the motor vehicle and/or a second drive shaft coupled to a second wheel drive shaft of the motor vehicle, wherein the first drive unit and the second drive unit may be coupled jointly to the first output shaft and/or the second output shaft. It is provided here that the second drive unit may be coupled via a separating clutch to the first drive unit, to a transmission output shaft of a transmission, which is coupled to the first drive unit, to a transmission shaft, which is or may be coupled to the second output shaft and which is or may be coupled to the first drive unit, to a differential gear output shaft of a differential gear mechanism, which, on the input side, is or may be coupled to the first drive unit, or to an intermediate shaft, which is or may be coupled to the first output shaft and to the transmission shaft by means of a clutch.

The advantage of such an embodiment of the motor vehicle or the drive device has already been highlighted. Both the motor vehicle and the drive device may be developed further in accordance with the above explanations, therefore reference is made to these.

Finally, the invention relates to a method for operating a drive device, in particular a drive device according the above explanations, wherein the drive device has a first drive unit, a second drive unit, as well as a first output shaft, which is or may be coupled to a first wheel drive shaft of the motor vehicle and/or a second drive shaft, which is or may be coupled to a second wheel drive shaft of the motor vehicle, wherein the first drive unit and the second drive unit may be coupled jointly to the first output shaft and/or the second output shaft. It is provided here that the second drive unit may be coupled via a separating clutch to the first drive unit, a transmission output shaft of a transmission, which is coupled to the first drive unit, to a transmission shaft, which is or may be coupled to the second output shaft, and which is or may be coupled to the first drive unit, to a differential gear output shaft of a differential gear mechanism, which, on the input side, is or may be coupled to the first drive unit, or to an intermediate shaft, which is coupled to the first output shaft, and which may be coupled to the transmission shaft by means of a clutch.

Reference is again made to the above explanations regarding the advantages of such an embodiment or such a method, and with regard to possible further developments.

In the context of a further embodiment of the invention, it is provided that in a first operating mode, the second drive unit is coupled to the first output shaft and decoupled from the second output shaft, and/or that in a second mode, the second drive unit is coupled to the first output shaft and the second output shaft. In the first operating mode, the second drive unit is only intended to drive the first output shaft, whereas the operative connection to the second output shaft is interrupted. However, the additionally or alternatively provided second operating mode provides for driving both the first and the second output shafts by means of the second drive unit.

Finally, a further embodiment of the invention may provide that if a limiting rotational speed is exceeded by the rotational speed of the second drive unit, then the rotational speed of the second drive unit is switched to a third operating mode, in which the separating clutch for decoupling the second drive unit is open. If the driving speed of the motor vehicle exceeds a certain maximum driving speed and accordingly the rotational speed also exceeds the limiting rotational speed or maximum rotational speed, then the second drive unit should be decoupled from further elements of the drive device, i.e., by opening the separating clutch. If the driving speed of the motor vehicle subsequently falls below the maximum driving speed, and consequently the rotational speed falls below the limiting rotational speed, then the disconnecting clutch can be closed again at least partially, preferably completely, in order to re-couple the second drive unit.

BRIEF DESCRIPTION OF THE DRAWINGS

The invention will be explained in more detail with reference to the exemplary embodiments shown in the drawing, without limiting the invention in any way. In the drawings.

DETAILED DESCRIPTION

Figure 1:
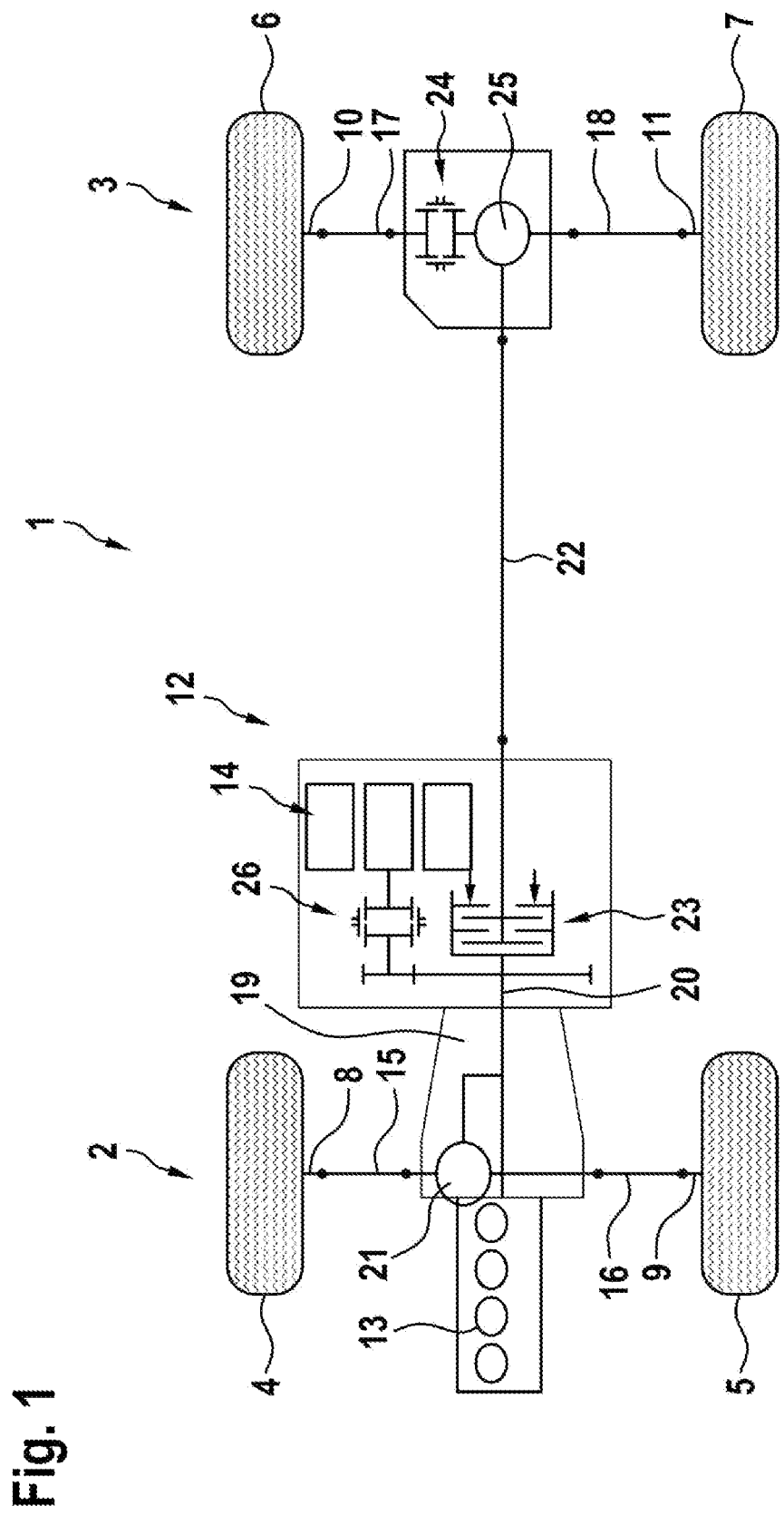
FIG. 1 shows a schematic representation of a motor vehicle with a drive device in a first embodiment.

FIG. 1 shows a schematic illustration of a motor vehicle 1 with two wheel axles 2 and 3, wherein each wheel axle 2 and 3 are associated with two wheels 4 and 5, or 6 and 7, respectively, each of which are coupled to a wheel drive shaft 8, 9, 10 and 11, respectively, and in particular rigidly. The motor vehicle 1 has a drive device 12, which has a first drive unit 13 and a second drive unit 14. Furthermore, the drive device 12 has a first output shaft 15 and a further first output shaft 16, as well as a second output shaft 17, and a further second output shaft 18. In the embodiment shown here, the first output shaft 15 is coupled to the wheel drive shaft 8, the further first output shaft 16 to the wheel drive shaft 9, the second output shaft to the wheel drive shaft 10, and the further second output shaft 18 to the wheel drive shaft 11, in particular rigidly.

It should be noted that the output shafts 15, 16, 17 and 18 are part of the drive device 12, while the wheel axles 8, 9, 10 and 11 are associated with a chassis of the motor vehicle 1, not shown, and therefore are not part of the drive unit 12. However, when mounting the drive unit 12 on the motor vehicle 1, the output shafts 15, 16, 17 and 18 are connected to the wheel axles 8, 9, 10 and 11 or coupled thereto.

The first drive unit 13 is coupled to a transmission 19, e.g., a gear change transmission. On its side remote from the first drive unit 13, the transmission 19 has a transmission output shaft 20. The transmission output shaft 20 is preferably rigidly and permanently coupled to the output shafts 15 and 16, e.g., by means of an axle differential transmission 21. Conversely, a clutch, in particular a starting clutch, can be provided between the first drive unit 13 and the transmission 19. Accordingly, the first drive unit 13 may be coupled to the first output shafts 15 and 16, i.e., via the transmission 19 and the starting clutch, which is usually provided. The starting clutch is present in particular if the first drive unit 13 is designed as an internal combustion engine. If, however, it is designed as an electric machine, or the like, such a starting clutch is not necessarily present.

The drive device 12, furthermore, has a transmission shaft 22, which may be coupled to the first drive unit 13 or at least the gear output shaft 20 by means of a first clutch 23, which may be designed as a multi-plate clutch. On the side of the transmission shaft 22, which is remote from the first clutch 23, it may be coupled to the second output shaft 17 via a second clutch 24. The second clutch 24 may be in the form of a claw clutch or a multi-plate clutch. In the embodiment shown here, the transmission shaft 22 is or may be coupled to the second output shafts 17 and 18 via a differential gear 25, in particular an axle differential gear. The transmission shaft 22 is thus designed as a differential gear input shaft.

A differential gear output shaft of the differential gear 25 may be coupled via the second clutch 24 to the second output shaft 17, which differential gear output shaft is coupled permanently to the other second output shaft 18, preferably rigidly and permanently. When the second clutch 24 is open, the transmission shaft 22 is decoupled from the second output shafts 17 and 18, at least from the second output shaft 17, at least under ideal frictionless conditions.

It becomes obvious that with clutches 23 closed, the first drive unit 13 is coupled both to the first output shaft 15 and the second output shaft 16. However, the second drive unit 14 may be coupled to the gear output shaft 20 via a separating clutch 26, which may be designed as a multi-plate clutch, claw clutch or sleeve clutch. When the separating clutch 26 is open, the second drive unit 14 is decoupled from other elements of the drive unit 12, i.e., in particular the transmission output shaft 20. Thus, the second drive unit 14 may optionally be connected.

Hence, only with the aid of the first drive unit 13, when the separation clutch 26 is open at the same time, both single-axle operation and multi-axle operation of the motor vehicle 1 can be achieved, i.e., by opening or closing the clutches 23 and 24 accordingly. Support for the first drive unit 13 may be provided both in single-axle and multi-axle operation by means of the second drive unit 14, for which purpose the separating clutch 26 is at least partially, preferably completely, closed.

In an alternative embodiment, the transmission shaft 22, the differential gear 25, the second clutch 24 and the two second output shafts 17 and 18 are absent, such that only the first wheel axle 2 of motor vehicle 1 may be driven.

Figure 2:
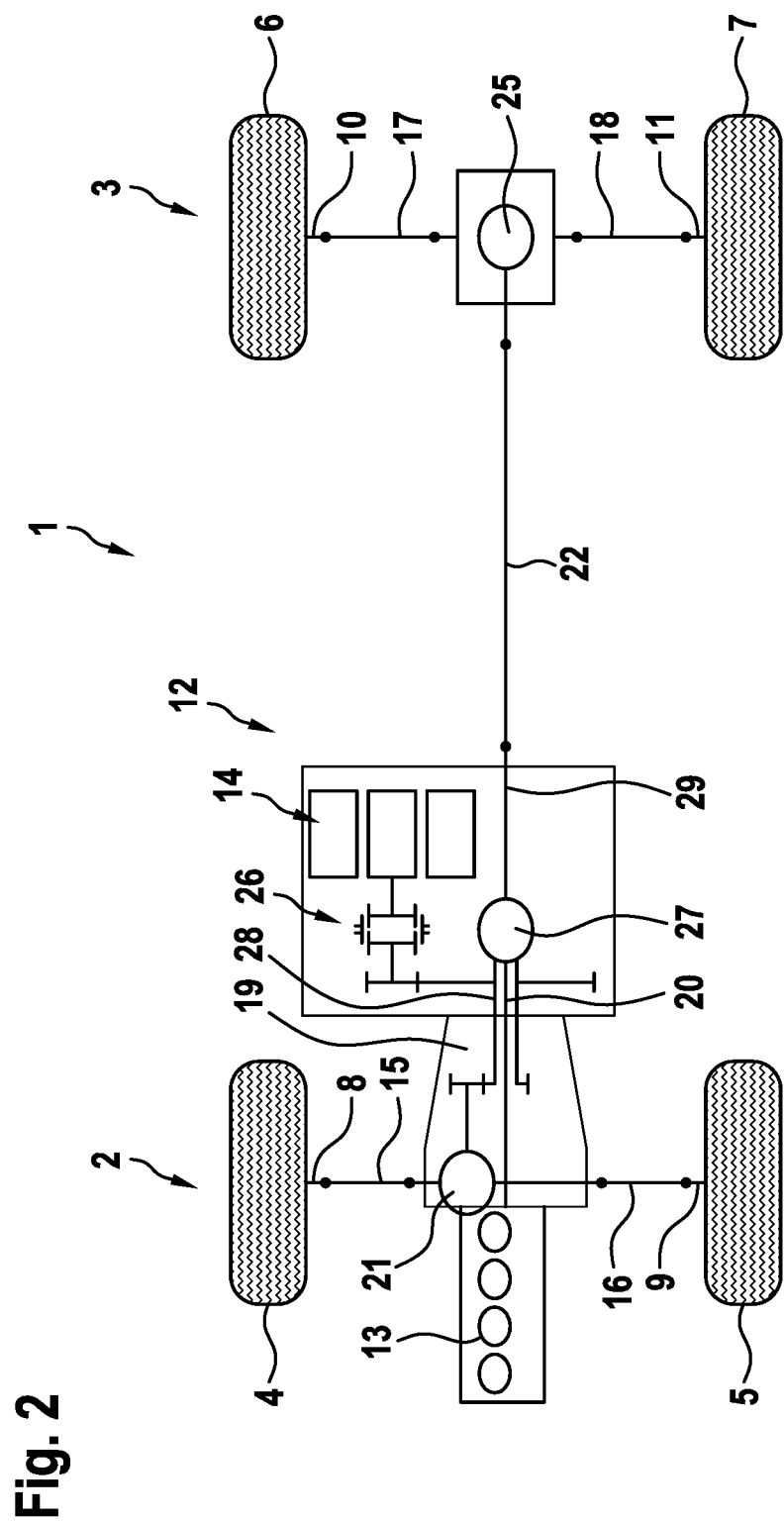
FIG. 2 shows the motor vehicle in a schematic illustration in a second embodiment of the drive device.

FIG. 2 shows the motor vehicle 1 in a further schematic illustration, wherein the drive device 12 is present in a second embodiment. It is basically similar to the embodiment described above, hence reference is made to the relevant explanations, and below reference is made only to the differences. These differences are essentially due to the fact that the clutches 23 and 24 are absent and instead the transmission shaft 22 is connected to the first drive unit 13 or the transmission output shaft 20 via a differential gear 27. The transmission output shaft 20 thus represents a differential gear input shaft of the differential gear 27.

The differential gear is preferably a center differential gear. A first differential gear output shaft 28 is connected to the first output shaft 15 or both first output shafts 15 and 16, respectively, i.e., preferably via the axle differential gear 21. A second differential gear output shaft 29 of the differential gear 27, however, is rigidly connected to, or forms the transmission shaft 22. The second drive unit 14 may now be coupled to the first differential gear output shaft 28 by means of the separating clutch 26, i.e. preferably rigid.

Figure 3:
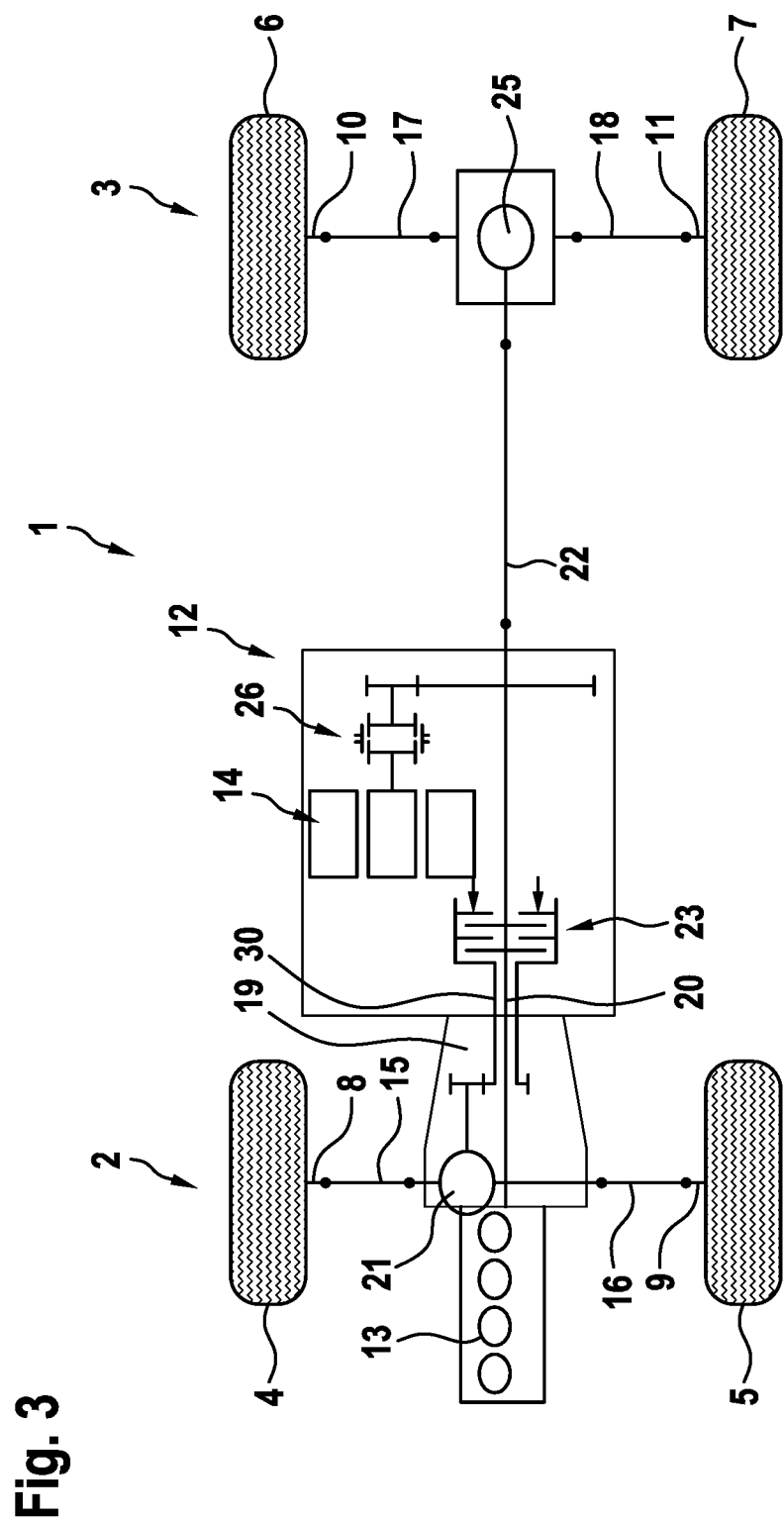
FIG. 3 shows the motor vehicle in the already known schematic representation with the drive device designed in a third embodiment.

FIG. 3 shows the motor vehicle 1 with a third embodiment of the drive unit 12. Reference is again made to the above explanations and only the differences, i.e., in particular relating to the second embodiment. These differences are due to the fact that instead of the differential gear 27, the first clutch 23 is present. Here, the first drive unit 13 or the transmission output shaft 20 is rigidly and/or permanently coupled to the transmission shaft 22. The first output shaft 15 or both first output shafts 15 and 16 may be coupled to the transmission shaft 22 via the first clutch 23. Accordingly, the first output shaft 15 or the output shafts 15 and 16 are coupled to an intermediate shaft 30, in particular rigidly and/or permanently, preferably via the axle differential gear 21. The intermediate shaft 30 can in turn be coupled to the transmission shaft 22 by means of the first clutch 23.

The separating clutch 26 is now connected to the transmission shaft 22 on its side remote from the second drive unit 14. Accordingly, with the first clutch open and the separating clutch 26 closed, the second output shaft 17 or the two second output shafts 17 and 18 may be coupled to the second drive unit 14, but also decoupled from the first drive unit 13.

Alternatively, it may be provided that the second drive unit 14 may also be coupled to the intermediate shaft 30 by means of the separating clutch 26. Accordingly, with the first clutch 23 open and the separating clutch 26 closed, the first output shaft 15 or the first two output shafts 15 and 16 are coupled to the second drive unit 14, but also decoupled from the first drive unit 13.

In an alternative embodiment, the first clutch 23, the differential gear 21 and the first two output shafts 15 and 16 are absent, such that only the second wheel axle 3 of motor vehicle 1 can be driven.

The invention claimed is:

1. A drive device for a motor vehicle comprising:
   a first drive unit and a second drive unit as well as a first output shaft rigidly connected to a first wheel drive shaft and a second output shaft rigidly connected to a second wheel drive shaft,
   wherein the first and second drive units are coupleable to at least one of the first and second output shafts,
   wherein the first drive unit is arranged on an input side of a gear-change transmission,
   wherein a transmission output shaft of the gear-change transmission is coupled to a first coupling element upstream of the first coupling element, and a transmission shaft is coupled to the first coupling element downstream of the first coupling element,
   wherein the second drive unit is coupled via at least a separating clutch to the transmission output shaft,
   wherein the first output shaft is coupled to the transmission output shaft, and
   wherein the transmission shaft is coupled via a second differential gear to the second output shaft.

2. The drive device according to claim 1, wherein the first output shaft is coupled via a first differential gear to the transmission output shaft,
   wherein the first coupling element is a first clutch, and
   wherein, in addition to the second differential gear, the second output shaft is coupled to the transmission shaft via a second clutch.

3. The drive device according to claim 1, wherein the second drive unit is coupled to the transmission output shaft upstream of the first coupling element.

4. The drive device according to claim 1, wherein the first coupling element is a center differential gear having a first, second, and third branch,
   wherein, on the first branch, the center differential gear is coupled to the first output shaft via a first differential gear,
   wherein, on the second branch, the center differential gear is rigidly connected to the transmission shaft,
   wherein, on the third branch, the center differential gear is rigidly connected to the transmission output shaft, and
   wherein a downstream side of the separating clutch joins with the first branch in order to couple the second drive unit to the transmission output shaft.

5. The drive device according to claim 1, wherein the first coupling element is a center differential gear having a first, second, and third branch,
   wherein, on the first branch, the center differential gear is coupled to the first output shaft via a first differential gear,
   wherein, on the second branch, the center differential gear is rigidly connected to the transmission shaft,
   wherein, on the third branch, the center differential gear is rigidly connected to the transmission output shaft, and
   wherein a downstream side of the separating clutch joins with the second branch in order to couple the second drive unit to the transmission output shaft.

6. A motor vehicle comprising the drive device according to claim 1.

7. A method for operating the drive device according to claim 1, comprising:
   coupling, in a first operating mode, the second drive unit to the first output shaft and decoupling the second drive unit from the second output shaft, and
   coupling, in a second operating mode, the second drive unit to both the first and second output shafts.

8. The method according to claim 7, wherein, when a rotational speed limit speed is exceeded by the second drive unit, a third operating mode is entered in which the separating clutch is opened, thereby decoupling the second drive unit from both the first and second output shafts.

9. The drive device according to claim 1, wherein the second drive unit is coupled to the transmission shaft downstream of the first coupling element.

10. The drive device according to claim 2, wherein the second drive unit is coupled to the transmission output shaft upstream of the first coupling element.

11. The drive device according to claim 2, wherein the second drive unit is coupled to the transmission shaft downstream of the first coupling element.

12. The drive device according to claim 1, wherein the transmission shaft at least partially axially overlaps the transmission output shaft.

13. The drive device according to claim 1, wherein the first output shaft is coupled to the transmission output shaft upstream of the first coupling element.

14. The drive device according to claim 13, wherein the first output shaft is coupled via a first differential gear to the transmission output shaft,
   wherein the first coupling element is a first clutch, and
   wherein, in addition to the second differential gear, the second output shaft is coupled to the transmission shaft via a second clutch.

15. The drive device according to claim 14, wherein the second drive unit is coupled to the transmission output shaft upstream of the first coupling element.

16. The drive device according to claim 14, wherein the second drive unit is coupled to the transmission shaft downstream of the first coupling element.

* * * * *